(12) United States Patent
Komulainen et al.

(10) Patent No.: US 7,688,603 B2
(45) Date of Patent: Mar. 30, 2010

(54) ARRANGEMENT FOR MONITORING A FREQUENCY CONVERTER

(75) Inventors: Risto Komulainen, Klaukkala (FI);
Janne Pakkala, Merikaarto (FI)

(73) Assignee: Vacon Oyj, Vaasa (FI)

( * ) Notice: Subject to any disclaimer, the term of this patent is extended or adjusted under 35 U.S.C. 154(b) by 194 days.

(21) Appl. No.: 11/415,190

(22) Filed: May 2, 2006

(65) Prior Publication Data
US 2006/0265160 A1    Nov. 23, 2006

(30) Foreign Application Priority Data
May 3, 2005    (FI)    ................................ 20050475

(51) Int. Cl.
*H02M 5/45*    (2006.01)
(52) U.S. Cl. .......................................... 363/37; 363/78
(58) Field of Classification Search .................. 363/35, 363/37, 50, 55, 74, 78, 95, 132
See application file for complete search history.

(56) References Cited

U.S. PATENT DOCUMENTS

| | | | |
|---|---|---|---|
| 4,331,994 A | | 5/1982 | Wirth |
| 5,631,813 A | | 5/1997 | Ikeshita |
| 5,705,904 A | * | 1/1998 | Kuriyama ............... 318/400.21 |
| 5,936,855 A | * | 8/1999 | Salmon .......................... 363/46 |
| 6,134,128 A | | 10/2000 | Enzensberger et al. |
| 6,801,441 B2 | | 10/2004 | Salama |
| 6,807,074 B2 | * | 10/2004 | Ollila et al. .................... 363/41 |
| 7,035,123 B2 | * | 4/2006 | Schreiber et al. .............. 363/37 |
| 7,176,674 B2 | * | 2/2007 | Karppinen et al. ........... 324/142 |
| 7,176,804 B2 | * | 2/2007 | Norrena et al. ............... 340/588 |
| 7,190,597 B2 | * | 3/2007 | Saren ............................ 363/35 |
| 7,294,989 B2 | * | 11/2007 | Saren ........................... 318/805 |
| 2004/0245961 A1 | | 12/2004 | Ueda et al. |

FOREIGN PATENT DOCUMENTS

| | | |
|---|---|---|
| FI | 108819 B | 3/2002 |
| JP | 8080059 A | 3/1996 |

\* cited by examiner

*Primary Examiner*—Adolf Berhane
(74) *Attorney, Agent, or Firm*—Birch, Stewart, Kolasch & Birch, LLP

(57) ABSTRACT

An arrangement and method for monitoring a frequency converter, the frequency converter being a voltage-controlled PWM frequency converter provided with a control unit and having an uncontrolled or a main-frequency controlled main bridge connectable to an alternating-current source ($U_{L1}$, $U_{L2}$, $U_{L3}$), a direct-voltage intermediate circuit and a controlled load bridge for producing a variable-frequency multiphase output voltage ($U_U$, $U_V$, $U_W$), which direct-voltage intermediate circuit of the frequency converter is provided with a small-capacitance direct-voltage capacitor, the main bridge being connected to the load bridge directly without a large-capacitance direct-voltage capacitor functioning as an intermediate energy storage, and the arrangement includes a measuring unit for measuring the direct voltage of the intermediate voltage circuit. In the arrangement, the measuring unit measures at least one quantity of the intermediate-circuit direct voltage, and the control unit determines on the basis of the aforesaid quantity at least one input voltage value and/or a failure situation of the frequency converter or its load circuit.

19 Claims, 2 Drawing Sheets

ARRANGEMENT FOR MONITORING A FREQUENCY CONVERTER

CROSS-REFERENCE TO RELATED APPLICATION

The present application claims priority under 35 U.S.C. §119 to Finnish Patent Application No. 2005-0475, filed May 3, 2005, the entire contents of which are hereby incorporated by reference.

BACKGROUND OF THE INVENTION

Field of the Invention

The present invention relates to a method and arrangement for monitoring a frequency converter. In particular, the invention concerns a method and arrangement for monitoring a frequency converter provided with a small capacitor in the intermediate voltage circuit and controlled by pulse-width modulation (PWM), said method and arrangement being based on measurement of the intermediate circuit voltage.

SUMMARY AND OBJECTS OF THE INVENTION

FIG. 1 presents a three-phase voltage-controlled PWM-frequency converter having a main bridge (rectifier) 10 for rectifying the three-phase alternating voltage of a supply network, consisting of phase voltages $U_{L1}$, $U_{L2}$, $U_{L3}$, to produce an intermediate-circuit direct voltage $U_{DC}$ and a load bridge (inverter) 11 for inverting the intermediate-circuit direct voltage to produce a three-phase alternating voltage of variable frequency having phase voltages $U_U$, $U_V$, $U_W$ when power is flowing from the network to the load. The frequency converter may feed e.g. a three-phase alternating-current motor. The load bridge 11 is a full-wave bridge with a control unit 12 controlling the phase switches of each phase by pulse-width modulation. 'Phase switch' refers to the switch formed by the semiconductor switches of the upper and lower branches of a phase together, with a diode connected in inverse-parallel with each semiconductor power switch. The main bridge 10 is an uncontrolled full-wave bridge, having a diode bridge consisting of diodes. The intermediate circuit of the frequency converter is provided with a DC capacitor, and an inductor $L_{AC}$ is connected between the main supply and the diode bridge of the frequency converter.

FIG. 2 presents voltage measurements and measuring units generally used for them in a frequency converter:

MEAS1=input voltage measurement, which is needed when monitoring e.g. main symmetry, phase absence, voltage brownouts or interruptions etc.

MEAS2=measurement of intermediate-circuit direct voltage, normally included in all PWM-frequency converters because this information is essential e.g. for purposes of motor control, MEAS3=measurement of the voltage of a semiconductor power switch, e.g. IGBT, which is needed for short-circuit protection (in a short-circuit situation, the voltage of one of the semiconductor power switches is too high even if the switch is conducting).

A PWM frequency converter provided with a small inter-mediate circuit capacitor is described e.g. in specification U.S. Pat. No. 6,801,441B2. In the frequency converter of this specification, the mainbridge 10 is connected to the load bridge 12 (FIG. 1) without a high-capacitance direct-voltage capacitor unit serving as an intermediate energy storage. The direct-voltage intermediate circuit of such a PWM-frequency converter is implemented using only a low-capacitance capacitor $C_{DC}$ for limiting the voltage spikes caused in switching situations by the energy stored in leakage inductances.

The object of the present invention is to overcome the drawbacks of prior art and to create a monitoring method and arrangement wherein all the information produced by the measurements indicated in FIG. 2 is obtained by merely measuring the intermediate-circuit direct voltage. Such a measurement is needed in the frequency converter in any case for motor control purposes, and thus the monitoring of input voltage and short-circuit situations according to the present invention requires no additional electronics or expenses.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention will be described in detail with reference to an example and the attached drawings, wherein.

DETAILED DESCRIPTION OF THE PREFERRED EMBODIMENTS

Figure 3:
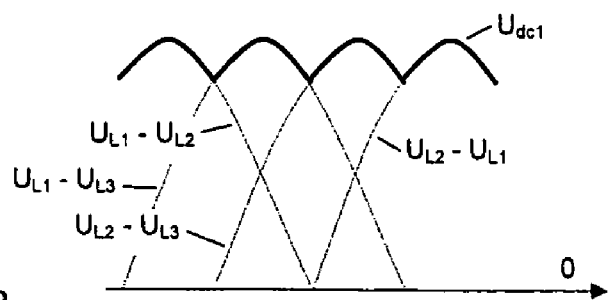
FIGS. 3 and 4 illustrate the formation of the intermediate-circuit voltage.

FIG. 3 represents the formation of the intermediate-circuit voltage from the input voltages via rectification when the intermediate-circuit capacitor is small. The intermediate-circuit voltage follows the highest input main voltage.

Figure 4:
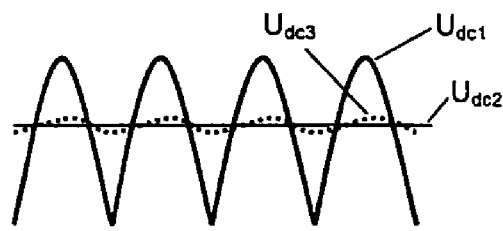

FIG. 4 represents the direct voltages of intermediate circuits provided with differently sized capacitors:

Udc1 corresponds to the voltage of an intermediate circuit provided with a very small capacitor not serving as an energy storage. The voltage follows the highest input main voltage. The present invention concerns a frequency converter in which the intermediate-circuit voltage has a curve form substantially like this curve Udc2 represents a theoretical, perfectly smoothed voltage of an intermediate circuit provided with an infinitely large capacitor Udc3 represents intermediate-circuit voltage in the case of traditional capacitor rating, wherein the capacitor serves as a significant energy storage. The voltage is nearly completely smoothed, but fluctuates slightly with the rectified supply network voltage. The voltage level is substantially lower than the maximum value of the supply main voltage.

Figure 5:
FIG. 5 represents the intermediate-circuit voltage in a frequency converter provided with a small intermediate-circuit capacitor.

FIG. 5 represents the intermediate-circuit voltage when the intermediate-circuit capacitor is small and the supply voltage asymmetric.

Figure 1:
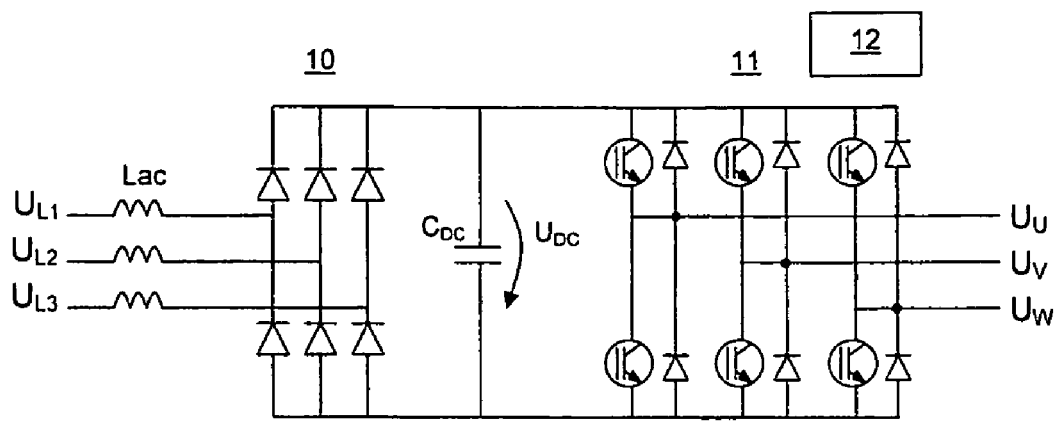
FIG. 1 presents a voltage-controlled PWM-frequency converter.
Figure 2:
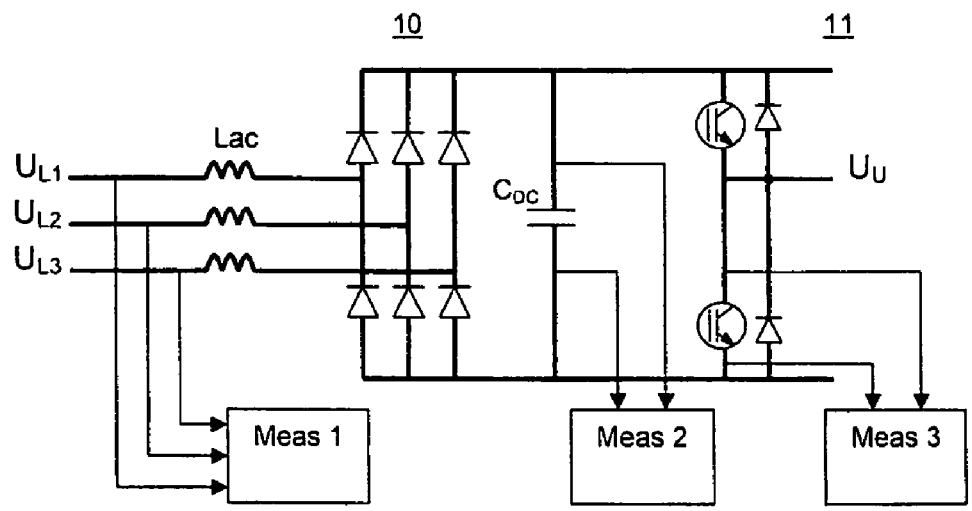
FIG. 2 illustrates voltage measurements on a frequency converter.
Figure 6:
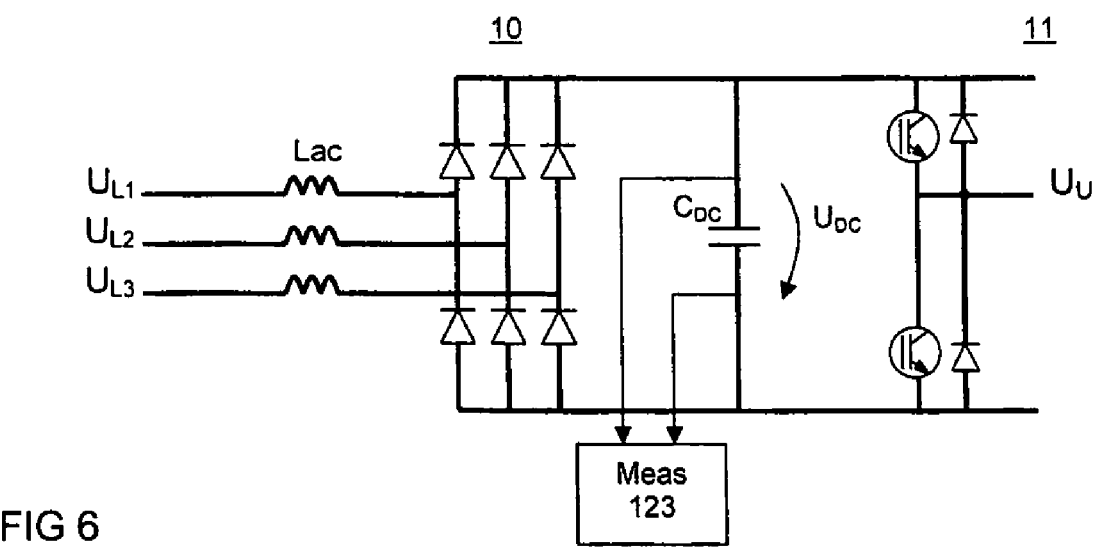
FIG. 6 illustrates the measurement of frequency converter voltages according to the invention.

FIG. 6 presents a measuring arrangement according to the invention in a PWM-frequency converter provided with a small intermediate-circuit capacitor as presented in FIG. 1, in which arrangement the intermediate-circuit voltage is measured by a measuring unit MEAS123. In the invention, a measuring arrangement is used wherein all the information produced by the measurements shown in FIG. 2 is obtained by measuring the intermediate-circuit direct voltage alone.

In the arrangement of the invention, the measuring unit MEAS123 measures the intermediate-circuit direct voltage $U_{DC}$. Based on this measurement data, the control unit 12 determines the voltage level, frequency and asymmetry of the main supply voltage as well as the presence of a motor-circuit short circuit situation. For the observation of supply-network phenomena of relatively low frequency, it may be advantageous to have the measurement signal filtered by a low-pass filter that filters out high-frequency voltage components, e.g. above 1000 Hz, from the measurement signal.

In detail, the determinations based on the intermediate-circuit measurement data are performed as follows:

In the frequency converter described above, the intermediate-circuit voltage $U_{DC}$ follows the highest main voltage of the supply network. Therefore, by indicating the instants of occurrence of the peak values of $U_{DC}$ (which occur consecutively de-pending on the main frequency (50 or 60 Hz) at intervals of about 2.7 ... 3.3 ms) as well as their voltage values at the peaks, it is possible to determine the following:

1. From the time interval between peaks, it is possible to calculate the main frequency, because in the three-phase system there occur 6 peaks during one cycle
2. From the voltage value at the peaks, it is possible to calculate the root mean square value (Urms) of the main supply voltage
3. If the voltage values at the peaks differ in magnitude and the same inequality is repeated regularly in periods of three peaks, then this is a sign of supply voltage asymmetry. The magnitude of asymmetry can be calculated directly from the largest differential voltage ΔUdc between voltage peaks (FIG. 5)
4. Since the intermediate-circuit capacitor is very small and the circuit has on the supply side an AC inductor, which represents a large impedance for fast phenomena, the intermediate-circuit voltage collapses very rapidly in a short circuit situation occurring in the motor circuit. Therefore, this situation can be indicated by means of a voltage comparator, which is a fast and cheap solution. A short circuit may occur either in the motor circuit (cable) or it may be caused by a failure of a semi-conductor power switch of the inverter. Especially low-power frequency converters may lack a separate AC inductor for reasons of cost, but this does not necessarily prevent the function described in this paragraph from being implemented, because in a short-circuit situation the intermediate-circuit voltage still collapses due to the short-circuit impedance of the supply network.

Let it be noted that, in a traditional frequency converter provided with a large intermediate-circuit capacitor, the above-described determinations are practically impossible because the intermediate-circuit voltage in a normal operating situation is almost completely smoothed ($U_{dc3}$, FIG. 4) and, due to the large energy content of the capacitor, does not collapse rapidly in a short-circuit situation.

It is obvious to the person skilled in the art that different embodiments of the invention are not exclusively limited to the example described above, but that they may be varied within the scope of the claims presented below. Thus, from the point of view of functionality and sphere of protection of the invention, for example the main bridge 10 may just as well be main-frequency controlled according to patent specification FI108819, and instead of the inductor $L_{AC}$ it is equally possible to use a DC-inductor placed between the main bridge 10 and the intermediate-circuit capacitor $C_{DC}$.

The invention claimed is:

1. A method for monitoring a frequency converter,
said frequency converter being a voltage-controlled PWM frequency converter having an uncontrolled main bridge connectable to an alternating-current source ($U_{L1}$, $U_{L2}$, $U_{L3}$), a direct-voltage intermediate circuit and a controlled load bridge for producing a variable-frequency multi-phase output voltage ($U_U$, $U_V$, $U_W$),
said direct-voltage intermediate circuit of the frequency converter is provided with a small-capacitance direct-voltage capacitor, the main bridge being connected to the load bridge directly without a large-capacitance direct-voltage capacitor functioning as an intermediate energy storage, and
in which method the direct voltage of the intermediate voltage circuit is measured,
the method comprising the steps of:
sizing a capacitance value of the small-capacitance direct-voltage capacitor so that the direct voltage of the intermediate voltage circuit varies strongly and follows a highest main voltage of the source,
measuring at least one quantity of the intermediate-circuit direct voltage, and
determining on the basis of the aforesaid quantity at least one input voltage value and/or a failure situation of the frequency converter or its load circuit,
wherein an a.c. source and the main bridge are three-phase, and
the failure situation is a short circuit which is identifiable so that a d.c. level drops to a value less than predetermined value.

2. A method according to claim 1, wherein said quantity is the voltage value of the direct-voltage peaks, on the basis of which is determined the voltage of the alternating-current main supply network.

3. A method according to claim 1, wherein said quantity is the time between peaks of the direct voltage, on the basis of which is determined the frequency of the alternating-current main supply network.

4. A method according to claim 1, wherein said quantity is the voltage value of the peaks of the direct voltage, on the basis of which is determined the asymmetry of the alternating-current main supply network.

5. A method according to claim 1, wherein said quantity is the direct-voltage level and the failure situation is a short-circuit situation, which is detected from the direct voltage level falling rapidly down.

6. A method according to claim 1, wherein said quantity is the voltage value of the peaks of the direct voltage, on the basis of which is determined the asymmetry of the alternating-current main supply network, and
wherein said quantity is the direct-voltage level and the failure situation is a short-circuit situation, which is detected from the direct voltage level falling rapidly down.

7. A method according to claim 1, wherein the main bridge is a rectifying bridge.

8. A method according to claim 1, wherein the main bridge includes rectifying diodes.

9. A method according to claim 1, wherein the step of measuring at least one quantity of the intermediate-circuit direct voltage includes measuring at least two quantities of the intermediate-circuit direct voltage.

10. A method according to claim 1, wherein the step of measuring at least one quantity of the intermediate-circuit direct voltage is performed by a measurement unit that is arranged in parallel to the small-capacitance direct-voltage capacitor.

11. A method according to claim 1, wherein the measurement unit is arranged in parallel to the small-capacitance direct-voltage capacitor.

12. A method according to claim 1, wherein the at least one supply voltage value and/or the failure situation is determined by a measurement unit that is arranged in parallel to the small-capacitance direct-voltage capacitor.

13. An arrangement for monitoring a frequency converter,
said frequency converter being a voltage-controlled PWM frequency converter provided with a control unit and having an uncontrolled main bridge connectable to an alternating-current source ($U_{L1}$, $U_{L2}$, $U_{L3}$), a direct-voltage intermediate circuit and a controlled load bridge for producing a variable-frequency multi-phase output voltage ($U_U$, $U_V$, $U_W$),
said direct-voltage intermediate circuit of the frequency converter is provided with a small-capacitance direct-voltage capacitor, the main bridge being connected to the load bridge directly without a large-capacitance direct-voltage capacitor functioning as an intermediate energy storage, the arrangement comprising:
a measuring unit for measuring the direct voltage of the intermediate voltage circuit,
wherein the measuring unit measures at least one quantity of the intermediate-circuit direct voltage, and
the control unit determines on the basis of the aforesaid quantity at least one input voltage value and/or a failure situation of the frequency converter or its load circuit,
wherein an a.c. source and the main bridge are three-phase, and the failure situation is a short circuit which is identifiable so that a d.c. level drops to a value less than predetermined value,
wherein a capacitance value of the small-capacitance direct-voltage capacitor is set so that the direct voltage of the intermediate voltage circuit varies strongly and follows a highest main voltage of the source.

14. An arrangement according to claim 13, wherein said quantity is the voltage value of the direct-voltage peaks, on the basis of which is determined the voltage of the alternating-current main supply network.

15. An arrangement according to claim 13, wherein said quantity is the time between peaks of the direct voltage, on the basis of which is determined the frequency of the alternating-current main supply network.

16. An arrangement according to claim 13, wherein said quantity is the voltage value of the peaks of the direct voltage, on the basis of which is determined the asymmetry of the alternating-current main supply network.

17. An arrangement according to claim 13, wherein said quantity is the direct-voltage level and the failure situation is a short-circuit situation, which is detected from the direct voltage level falling rapidly down.

18. An arrangement according to claim 13, wherein the measurement unit for measuring at least one quantity of the intermediate-circuit direct voltage measures at least two quantities of the intermediate-circuit direct voltage.

19. Use of direct-voltage measurement of the intermediate voltage circuit of a frequency converter, said frequency converter being a voltage-controlled PWM frequency converter having an uncontrolled main bridge connectable to an alternating-current source ($U_{L1}$, $U_{L2}$, $U_{L3}$), a direct-voltage intermediate circuit and a controlled load bridge for producing a variable-frequency multi-phase output voltage ($U_U$, $U_V$, $U_W$), which direct-voltage intermediate circuit of the frequency converter is provided with a small-capacitance direct-voltage capacitor, the main bridge being connected to the load bridge directly without a large-capacitance direct-voltage capacitor functioning as an intermediate energy storage,
to determine at least one supply voltage value and/or a failure situation of the frequency converter or its load circuit,
wherein an a.c. source and the main bridge are three-phase, and the failure situation is a short circuit which is identifiable so that a d.c. level drops to a value less than predetermined value,
wherein a capacitance value of the small-capacitance direct-voltage capacitor is set so that the direct voltage of the intermediate voltage circuit varies strongly and follows a highest main voltage of the source.

* * * * *